(12) United States Patent
Solis (10) Patent No.: US 10,410,210 B1
(45) Date of Patent: Sep. 10, 2019

(54) SECURE GENERATION AND INVERSION OF TOKENS

(71) Applicant: National Technology & Engineering Solutions of Sandia, LLC, Albuquerque, NM (US)

(72) Inventor: John Hector Solis, San Francisco, CA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 947 days.

(21) Appl. No.: 14/676,637

(22) Filed: Apr. 1, 2015

(51) Int. Cl.
  *G06Q 20/38* (2012.01)
  *G06Q 20/36* (2012.01)

(52) U.S. Cl.
  CPC ......... *G06Q 20/382* (2013.01); *G06Q 20/367* (2013.01); *G06Q 2220/00* (2013.01)

(58) Field of Classification Search
  None
  See application file for complete search history.

(56) References Cited

U.S. PATENT DOCUMENTS

| | | | |
|---|---|---|---|
| 6,163,771 A | 12/2000 | Walker et al. | |
| 6,665,709 B1 * | 12/2003 | Barron | G06F 12/1408 707/999.005 |
| 7,079,655 B1 * | 7/2006 | Tochikubo | H04L 9/08 380/273 |
| 7,827,101 B2 | 11/2010 | Mascavage, III | |
| 8,788,429 B2 | 7/2014 | Tieken | |
| 8,875,263 B1 * | 10/2014 | van Dijk | G06F 21/31 709/225 |
| 9,430,652 B1 * | 8/2016 | Mattsson | G06F 21/6245 |
| 9,450,754 B2 * | 9/2016 | Roskind | H04L 9/30 |
| 9,858,431 B2 * | 1/2018 | Farkash | G06F 21/6209 |
| 2002/0138445 A1 | 9/2002 | Laage et al. | |
| 2007/0198432 A1 | 8/2007 | Pitroda et al. | |
| 2007/0262138 A1 | 11/2007 | Somers et al. | |
| 2010/0121767 A1 | 5/2010 | Coulter et al. | |
| 2012/0041881 A1 * | 2/2012 | Basu | G06Q 20/02 705/67 |
| 2012/0324555 A1 * | 12/2012 | Chambers | H04L 9/0891 726/6 |
| 2014/0052642 A1 * | 2/2014 | Spies | G06Q 20/20 705/71 |
| 2014/0122344 A1 * | 5/2014 | Foulds | G06Q 20/38215 705/67 |
| 2017/0372294 A1 * | 12/2017 | Pelletier | G06Q 20/3224 |

* cited by examiner

*Primary Examiner* — Steven S Kim
*Assistant Examiner* — Timothy Paul Sax
(74) *Attorney, Agent, or Firm* — Medley, Behrens & Lewis, LLC (57) ABSTRACT

Described herein are various technologies related to secure generation of tokens and secure inversion of tokens. A tokenization system executes in a secure execution environment, and is configured to receive a string and an encrypted tokenization function. The tokenization system decrypts the encrypted tokenization function, and executes the tokenization function over the string to generate a token. The token is transmitted to a logically separate computing environment, and the tokenization system deletes the tokenization function and the string.

20 Claims, 6 Drawing Sheets

SECURE GENERATION AND INVERSION OF TOKENS

STATEMENT OF GOVERNMENTAL INTEREST

This invention was developed under Contract DE-AC04-94AL85000 between Sandia Corporation and the U.S. Department of Energy. The U.S. Government has certain rights in this invention.

BACKGROUND

To protect individuals from credit card and identity theft, the Payment Card Industry Data Security Standard (PCI DSS) mandates protection for all forms of stored credit card data. A common technique for satisfying portions of the PCI DSS requirements includes tokenizing account numbers (e.g., credit card account numbers, checking account numbers, debit account numbers, etc.). Conventional tokenization systems are configured to generate tokens based upon received account numbers, where a token for an account number is a randomized or pseudo-randomized sequence of characters that retains the formatting of the account number. Thus, the sequence of values 5645 6245 9878 4451 can be a valid token for account number 1111 2222 3333 4444, while "6fAlee%Z" would not be a valid token for the account number. Oftentimes, tokens are retained in a database for some length of time; for example, when a user has authorized a merchant to make a recurring charge to an account, the merchant may retain a token for the account in the database.

While tokens by themselves do not represent a security risk (since they are not strongly linked to the original credit card number, and cannot be used by themselves to make purchases), if a tokenization algorithm used to generate the tokens is compromised, such algorithm can be used to "invert" the tokens, and thus can be used to acquire the account numbers. Since a merchant must invert a token to acquire an account number (to obtain purchase approval from an issuer of the account), the merchant (or an agent of the merchant) typically stores the tokenization function in a readily-accessible location, such that the tokenization function can be retrieved relatively quickly when a token is to be inverted. This leads to a security risk, as a skilled hacker may acquire the tokenization function.

SUMMARY

The following is a brief summary of subject matter that is described in greater detail herein. This summary is not intended to be limiting as to the scope of the claims.

Described herein are various technologies pertaining to generating tokens for respective character strings and inverting such tokens in a secure manner. With more particularity, an architecture that facilitates secure generation of tokens and secure inversion of tokens is described herein. The architecture includes a secure execution environment, which can be or include a virtual machine, a trusted region of a processor, an application specific integrated circuit (ASIC) housed in an apparatus that can be coupled to a computing device (e.g., a Universal Serial Bus (USB) stick), or the like. The secure execution environment is in communication with a computing device that comprises a token database, wherein the token database comprises a plurality of tokens that respectively represent a plurality of character strings (e.g., account numbers, social security numbers, etc.). The secure execution environment can be configured to generate tokens for inclusion in the token database, and can further be configured to invert tokens in the token database.

With reference to generating tokens for inclusion in the token database, the secure execution environment includes a tokenization system, wherein the tokenization system is configured to receive data that includes an encrypted tokenization function and a character string. The tokenization system, responsive to receiving the encrypted tokenization function, can decrypt the tokenization function utilizing a decryption algorithm that is securely retained in the secure execution environment. The tokenization system can then execute the tokenization function over the character string to generate a token that is representative of the character string. The tokenization system thereafter outputs the token for retention in the token database, and deletes the character string and the tokenization function.

With reference to inverting tokens, the tokenization system can receive data that includes the encrypted tokenization function and a token from the token database. The tokenization system, responsive to receiving the encrypted tokenization function, can decrypt the tokenization function utilizing the decryption algorithm. The tokenization system can invert the tokenization function, and can execute the inverted function over the received token, resulting in a character string that is represented by the token. The tokenization system outputs the character string, deletes the tokenization function (and the inverted tokenization function if retained), and optionally deletes the token.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining securely generating and inverting tokens are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass 1) computer-readable data storage that is configured with computer-executable instructions that cause certain functionality to be performed when executed by a processor; and/or 2) hardware circuitry that is configured to perform certain functionality upon receipt of one or more signals. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

Figure 1:
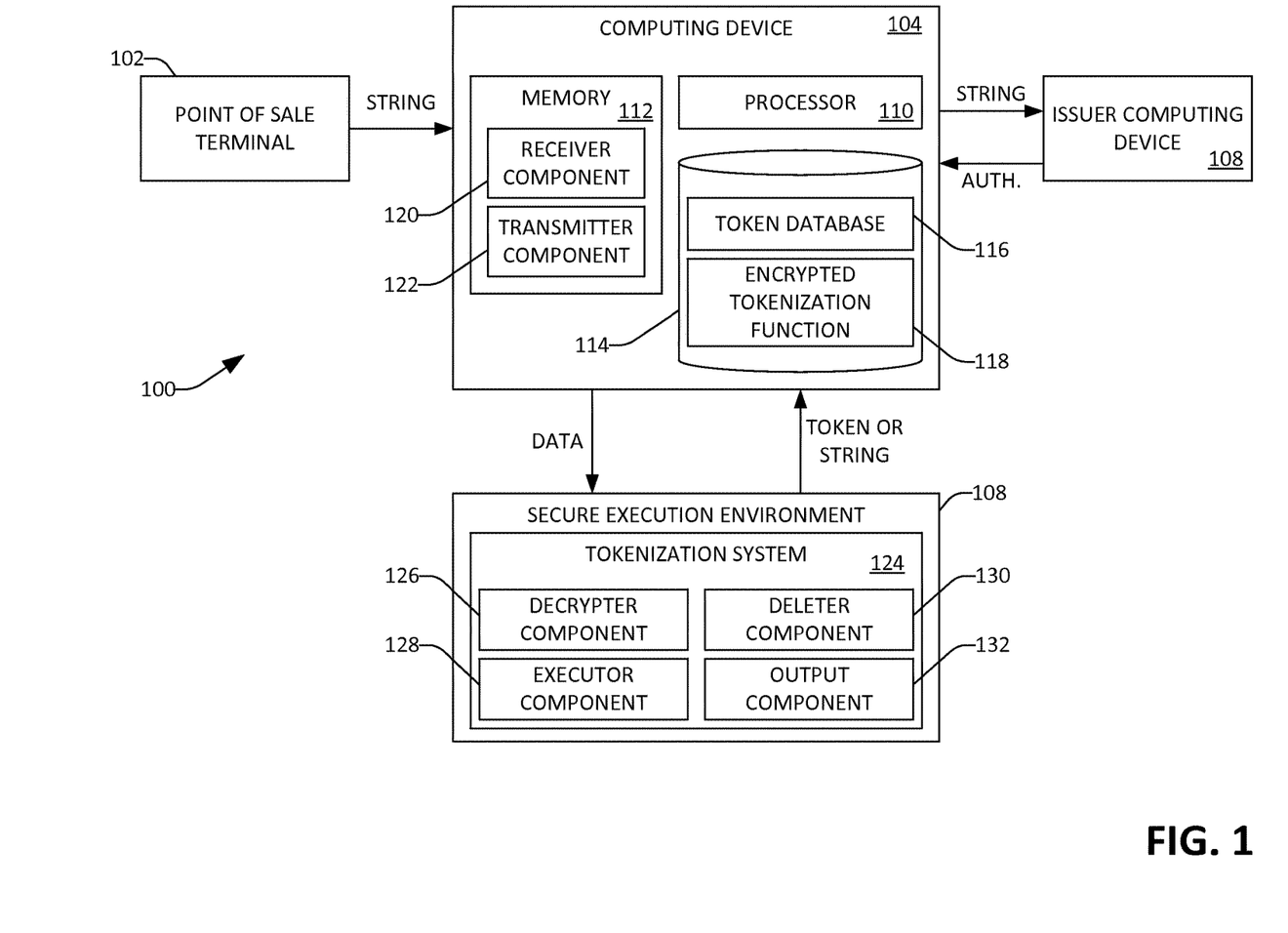
FIG. 1 is a functional block diagram of an exemplary system that facilitates securely generating tokens and inverting tokens.

With reference to FIG. 1, a functional block diagram of an exemplary system 100 that facilitates securely generating and inverting tokens is illustrated. A token is a sequence of characters that represents a character string (that conforms to a predefined format), where the token has the same format as the character string represented by the token. In an example, the token and the character string are numeric (such as account numbers or social security numbers), although it is contemplated that the token and the character string may be alphanumeric or include other suitable characters. It is to be understood that the approaches described herein for securely generating tokens and securely inverting tokens are equally applicable to various string encodings. For example, the approaches described herein are equally applicable to ASCII, UTF-8, Base64, etc.

The system 100 includes a point of sale terminal 102, a computing device 104, a secure execution environment 106, and an issuer computing device 108. The point of sale terminal 102 is in network communication with the computing device 104. The computing device 104 is in communication with the secure execution environment 106. For example, the secure execution environment may be a circuit or other suitable apparatus that can be physically coupled to the computing device 104. For example, the secure execution environment 106 can be included in a Universal Serial Bus (USB) stick that can be connected to the computing device 104 by way of a suitable USB port. In another example, the secure execution environment can be included in the computing device 104 (e.g., in a virtual machine, in a secure portion of a processor of the computing device 104, such as Intel® Trusted Execution Technology (Intel® TXT), the ARM TrustZone®, etc.). The computing device 104 is also in network communication with the issuer computing device 108.

In an exemplary embodiment, the system 100 is configured to allow for recurring charges to be securely applied to accounts of users. In an example, a user can provide account information at the point of sale terminal 102 (e.g., the user can swipe a credit card through a credit card reader, can enter an account number into a field shown in a web page rendered by a web browser, etc.). A character string (e.g., a numerical string) can then be transmitted to the computing device 104, wherein the character string can be the account number, an encryption of the account number, etc. In an example, the computing device 104 can transmit the string to the issuer computing device 108, which can be configured to authorize charges to the account of the user. For example, the issuer computing device 108 can ensure that the account information is valid, that the account corresponding to the account information has sufficient funds to allow for the purchase of goods or services, etc. The issuer computing device 108, responsive to authorizing the charges, can transmit an indication to the computing device 104 that the account corresponding to the account information is valid and that the requested charges to the account have been authorized. As will be described in greater detail below, the computing device 104 (if authorized by the user) can retain the account information, thereby allowing for recurring payments, allowing for the user to make subsequent purchases without entering her account number, etc.

To obfuscate the account number, the computing device 104 can be configured to cause a token to be generated, wherein the token is representative of the account number. Absent a tokenization function used to generate the token, however, the account number cannot be derived from the token. The computing device 104 can be configured to retain the token and cause the token to be inverted (to acquire the account number) when a subsequent charge is to be made to the account. As will be described in greater detail herein, the computing device 104 and the secure execution environment 108 can operate in conjunction to securely generate and invert tokens.

With more detail pertaining to the computing device 104, the computing device 104 includes a processor 110 and a memory 112, wherein the processor 110 executes instructions in the memory 112. The computing device 104 additionally includes a data store 114, wherein the data store comprises a token database 116 and an encrypted tokenization function 118. While the data store 114 is shown as being a single data store, it is to be understood that the data store 114 can represent several storage units that are coupled to a network, such as can be found in a data center. The token database 116 can include a plurality of tokens which are respectively representative of a plurality of strings (e.g., account numbers, social security numbers, or other strings that are desirably kept secure and have a predefined format).

The memory 112 includes a receiver component 120 that is configured to receive an indication that 1) a token is to be generated (based upon a character string) and retained in the token database 116; or 2) a token in the token database 116 is to be inverted. The memory 112 also includes a transmitter component 122 that is configured to transmit data to the secure execution environment 108 responsive to the receiver component receiving the indication referenced above. When the token is to be generated, the data transmitted by the transmitter component 122 to the secure execution environment 108 comprises: 1) the character string that the token is to represent; and 2) the encrypted tokenization function 118. When the token from the token database 116 is to be inverted, the data transmitted by the transmitter component 122 to the secure execution environment 108 comprises: 1) the token; and 2) the encrypted tokenization function. In an exemplary embodiment, when the secure execution environment 108 includes local (secure) storage, the encrypted tokenization function can be locally cached for some predefined amount of time (optionally with reference to a most recent use of the tokenization function), to improve efficiency of token generation and/or inversion. Accordingly, the encrypted tokenization function 118 may not need to be transmitted from the computing device 104 to the secure execution environment 108 each time a token is to be generated or inverted.

The secure execution environment 108 comprises a tokenization system 124, wherein the tokenization system is configured to securely generate tokens and invert tokens. Thus, componentry of the tokenization system 124 is exclusively limited to the secure execution environment 108. The tokenization system 124 includes a decrypter component 126 that is configured to decrypt the encrypted tokenization function 118. The decrypter component 126 can be hardware or software-based. In an example, the decrypter component 126 can conform to the Advanced Encryption Standard (AES). In another example, the decrypter component 126 can be or include an RSA hardware accelerator. The tokenization system 124 further comprises an executor component 128 that is configured to execute the tokenization function over a character string, such that a token can be generated. The executor component 128 can further be configured to invert the tokenization function, such that, upon receipt of a token, the executor component 128 can execute the inverted tokenization function over the token to generate a character string (e.g., invert the token).

The tokenization system 124 also comprises a deleter component 130 that is configured to delete the tokenization function and the data received from the computing device 104. This ensures that, even if the secure execution environment 108 is obtained by a malicious entity, the account number and/or the tokenization function are not acquired by the malicious entity. The tokenization system 124 additionally includes an output component 132 that outputs either a token or a character string (depending upon what is requested by the computing device 104) to the computing device 104. In an example, when the tokenization system 124 is to output the character string, the tokenization system 124 can encrypt the character string using an encryption scheme known by the issuer computing device 108, such that the computing device 104 does not have access to an account number (in the clear).

Operation of the computing device 104 and the secure execution environment 108 is now described for two scenarios: 1) when a token is to be added to the token database 116; and 2) when a token from the token database 116 is to be inverted. With reference to the first scenario, a user at the point of sale terminal 102 provides a string that can be used to purchase an item or service (e.g., a credit card number) to the point of sale terminal 102. The point of sale terminal 102 optionally encrypts the string, and transmits the string (encrypted or in the clear) to the computing device 104. The computing device 104 transmits the string to the issuer computing device 108, which authorizes the purchase. The issuer computing device 108 than transmits a signal to the computing device 104, indicating that the account is valid.

The receiver component 120 of the computing device 104 can receive the signal, which may be the indication that a token representative of the account number is to be added to the token database 116. In another example, the string transmitted from the point of sale terminal 102 can be the indication that a token representative of the account number is to be added to the token database 116. The transmitter component 122, responsive to the receiver component 120 receiving the indication, transmits data to the secure execution environment 108, wherein the data includes the (possibly encrypted) string and the encrypted tokenization function 118 from the data store 114.

The tokenization system 124 receives the data, and decrypts the string if the string is encrypted. The decrypter component 126 decrypts the encrypted tokenization function (e.g., utilizing a cryptographic function that is securely retained in the secure execution environment 108). The executor component 128 then executes the tokenization function over the string, thereby generating a token that is based upon the string. Responsive to the token being generated by the executor component 128, the deleter component 130 deletes the string and the tokenization function, and the output component 132 outputs the token to the computing device 104, where it is retained in the token database 116.

With reference to the second scenario noted above, an indication can be received that the account of the user is to be subsequently charged. For example, the user may have indicated that another purchase is to be made, or may have set up a recurring charge to be applied to the account of the user. The receiver component 120 receives an indication that the account of the user is to be charged, and responsive to the receiver component 120 receiving this indication, the transmitter component 122 transmits data to the secure execution environment 108, wherein the data includes the token corresponding to the account from the token database 116 and the encrypted tokenization function 118.

The tokenization system 124 receives the data from the computing device 104, and the decrypter component 126 decrypts the encrypted tokenization function 118 (and inverts such function). The executor component 128 executes the inverted tokenization function over the token, resulting in the string (e.g., the account number). The executor component 128 can optionally encrypt the string using an encryption scheme shared with the issuer computing device 108. Responsive to the executor component 128 generating the string, the deleter component 130 deletes the token and the inverted tokenization function. The output component 132 outputs the (potentially encrypted) string to the computing device 104, which in turn transmits the string to the issuer computing device 108. The issuer computing device 108 receives the string (and performs decryption if necessary), and authorizes the charge to be applied to the account of the user.

As indicated previously, the secure execution environment 108 can be any suitable environment that is logically separated from the computing device 104. Thus, for instance, the secure execution environment 108 can be implemented by way of Intel® Trusted Execution Technology (Intel® TXT), ARM® TrustZone®, or the like. Other technologies that support secure execution regions in processors are also contemplated. In another example, the secure execution environment 108 can be a co-located virtual machine executing on the computing device 104, while the components 120 and 122 execute in a different virtual machine. In yet another example, an apparatus that is connectable to the computing device 104 by way of a port (e.g., a USB apparatus) may include the secure execution environment 108. In such a case, the USB apparatus can include a housing enclosure; an integrated circuit device within the housing enclosure; and a male USB connector coupled to the integrated circuit device. Optionally, the housing enclosure may be tamper-proof or tamper-resistant to increase security of the device.

Further, while the exemplary system 100 has been described with respect to account numbers, it is to be understood that features described above are applicable to other types of data that conform to a predefined format, and can therefore include social security numbers, license numbers, IP addresses, passwords, and the like.

Figure 2:
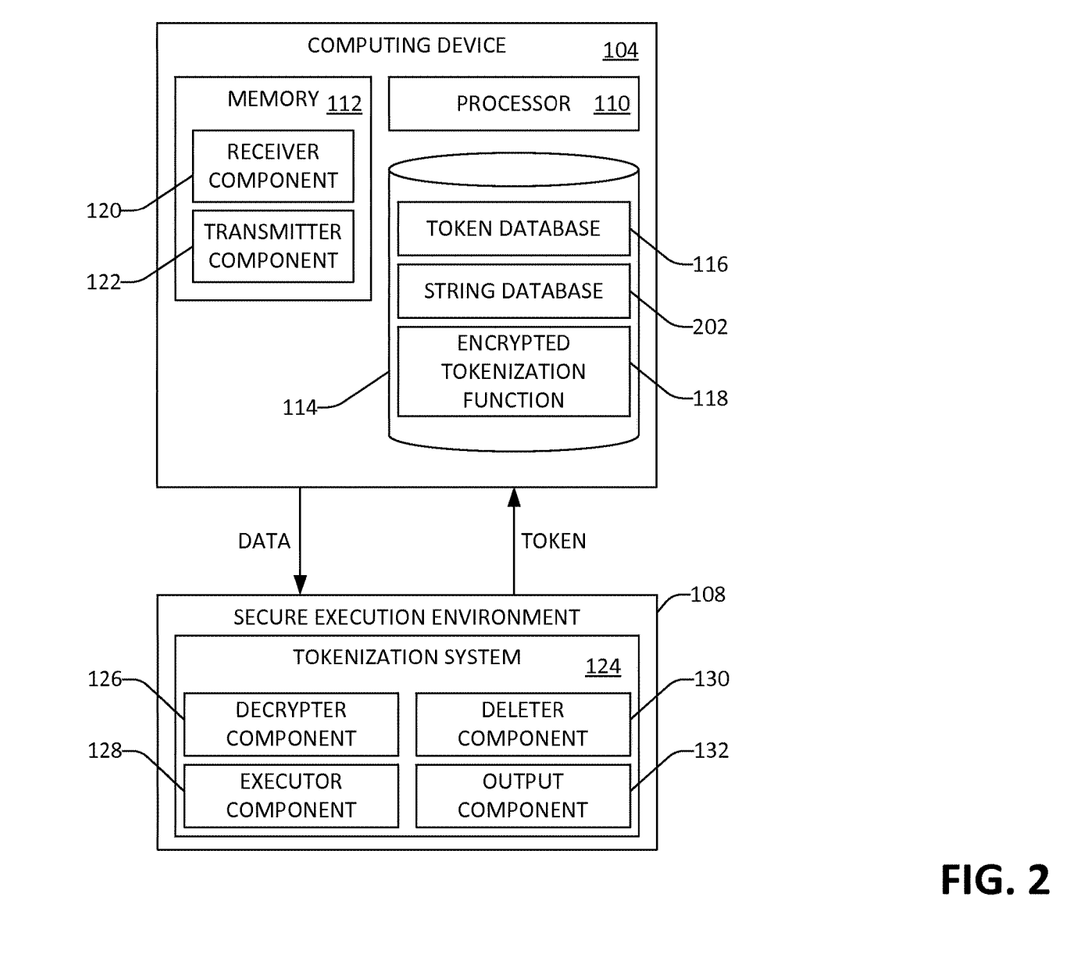
FIG. 2 is a functional block diagram that illustrates an exemplary system that facilitates generating a token database.

With reference to FIG. 2, a functional block diagram illustrating exemplary operations of the computing device 104 and the secure execution environment 108 is shown. In this example, the data store 114 includes a legacy string database 202, which includes a plurality of strings (e.g., account numbers). To increase security, it may be desirable to remove the string database 202 from the computing device 104; however, to allow for recurring charges, it may be desirable to retain user account information. Accordingly, it may be desirable to replace the string database 202 with the token database 116, which includes tokens that respectively represent the strings of the string database 202.

Accordingly, the transmitter component 122 can transmit the strings in the string database 202 to the secure execution environment 108. In this example, the secure execution environment 108 may include the tokenization function, and the executor component 128 can execute the tokenization function over each string in the string database 202 to generate a plurality of tokens. The deleter component 130, responsive to the plurality of tokens being generated, can delete the character strings. Additionally, the tokenization system 124 can be configured to encrypt the tokenization function, and the deleter component 130 can delete the (unencrypted) tokenization function. The output component 132 can then output the tokens and the encrypted tokenization function 118. The tokens can be retained in the data store 114 as the token database 116, and the encrypted tokenization function 118 can also be retained in the data store 114. The computing device 104, responsive to receiving the tokens (or responsive to transmitting the strings in the string database 202 to the secure execution environment 108) can delete the string database 202. Subsequent to the token database 116 being generated and retained at the computing device 104, the computing device 104 and the tokenization system 124 can act as described above with respect to FIG. 1 when generating tokens or inverting tokens.

Figure 3:
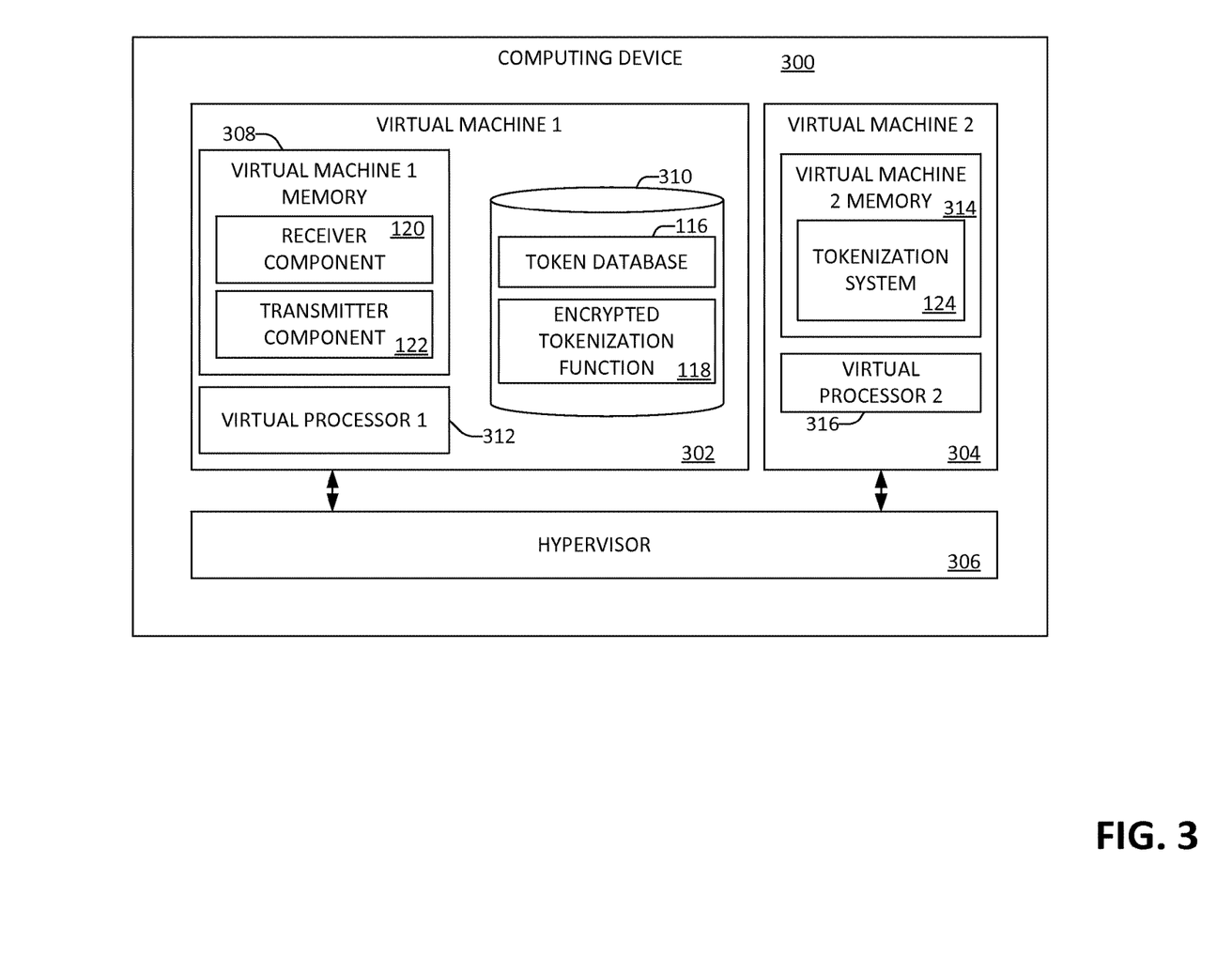
FIG. 3 is a functional block diagram of an exemplary system that facilitates securely generating tokens and inverting tokens.

FIG. 3 is functional block diagram illustrating an exemplary computing device 300. In the exemplary embodiment depicted in FIG. 3, the computing device 300 is configured with functionality of both the computing device 104 and the secure execution environment 108. With more particularity, the computing device includes a first virtual machine (VM1) 302 and a second virtual machine (VM2) 304, wherein VM1 302 and VM2 304 are logically separated from one another. The computing device 300 also includes a hypervisor 306, wherein data can be passed between VM1 302 and VM2 304 by way of the hypervisor 306.

VM1 302 includes VM1 memory 308, VM1 data store 310, and VM1 processor 312. VM1 memory 308 can be virtual memory for VM1 302 (backed by physical memory of the computing device 300), and VM1 data store 310 can be virtual persistent storage backed by, for example, disk, a solid state drive, etc. VM1 processor 312 executes instructions in VM1 memory 308, wherein VM1 processor 312 is a virtual processor backed by a physical processor of the computing device 300. As shown, VM1 memory 308 includes the receiver component 120 and the transmitter component 122, which act as described above. VM1 data store 310 includes the token database 116 and the encrypted tokenization function 118.

VM2 304 includes a VM2 memory 314 and a VM2 processor 316, wherein the VM2 processor executes instructions in VM2 memory 314. VM2 memory 304 is backed by physical memory of the computing device 300, and VM2 processor 316 is backed by the physical processor of the computing device 300. VM2 memory 314 includes the tokenization system 124, which acts as described above.

As indicated above, VM1 302 and VM2 304 are logically separate from one another—accordingly, VM1 processor 312 is unable to execute the tokenization system 124 in VM2 memory 314. Likewise, VM2 processor 316 is unable to execute instructions in VM1 memory 308 or directly access contents of VM1 data store 310.

In operation, the receiver component 120 can receive, for example, an indication that a token in the token database 116 is to be inverted. Responsive to the receiver component 120 receiving such indication, the transmitter component 122 can transmit the token and the encrypted tokenization function 118 to VM2 304 (e.g., by way of the hypervisor 306). The tokenization system 124 in VM2 304 receives the encrypted tokenization function and the token (by way of the hypervisor 306), decrypts the tokenization function, inverts the tokenization function, and inverts the token to obtain the character string (e.g., account number). The tokenization system 124 then transmits the character string to VM1 302 by way of the hypervisor 306, and deletes both the tokenization function and the token from VM2 304.

In another example, the receiver component 120 can receive an indication that a token is to be added to the token database 116 (e.g., can receive a character string). The transmitter component 122, responsive to the receiver component receiving the indication, transmits the character string and encrypted tokenization function 118 to VM2 304 by way of the hypervisor 306. The tokenization system 124, as described above, decrypts the encrypted tokenization function 118 and executes the tokenization function over the character string, thereby generating a token. The tokenization system 124 transmits the token to VM1 by way of the hypervisor 306, where it is included in the token database 116. The tokenization system 124 then deletes the tokenization function and the character string from VM2 304.

Figure 4:
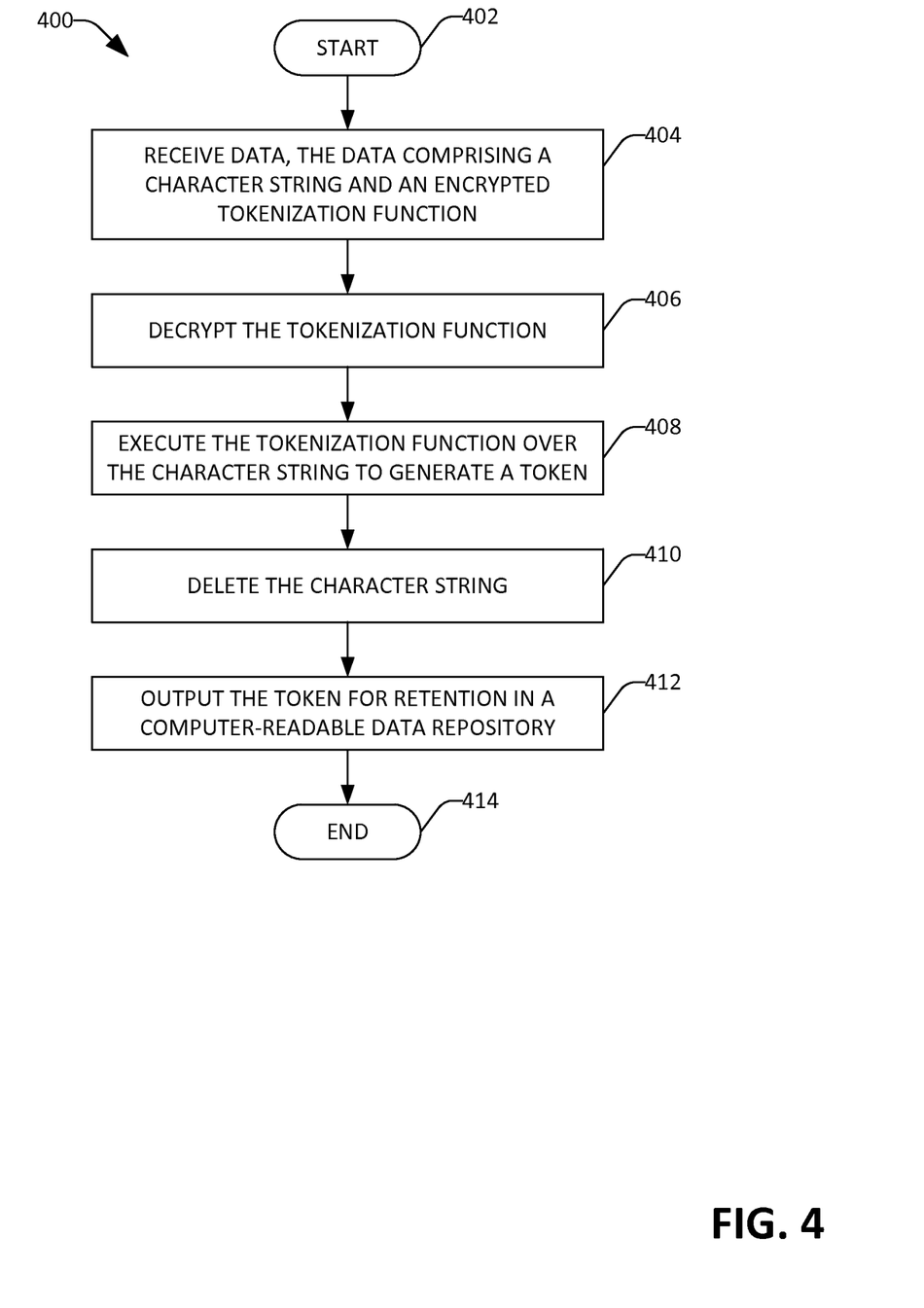
FIG. 4 is a flow diagram illustrating an exemplary methodology for securely generating a token.
Figure 5:
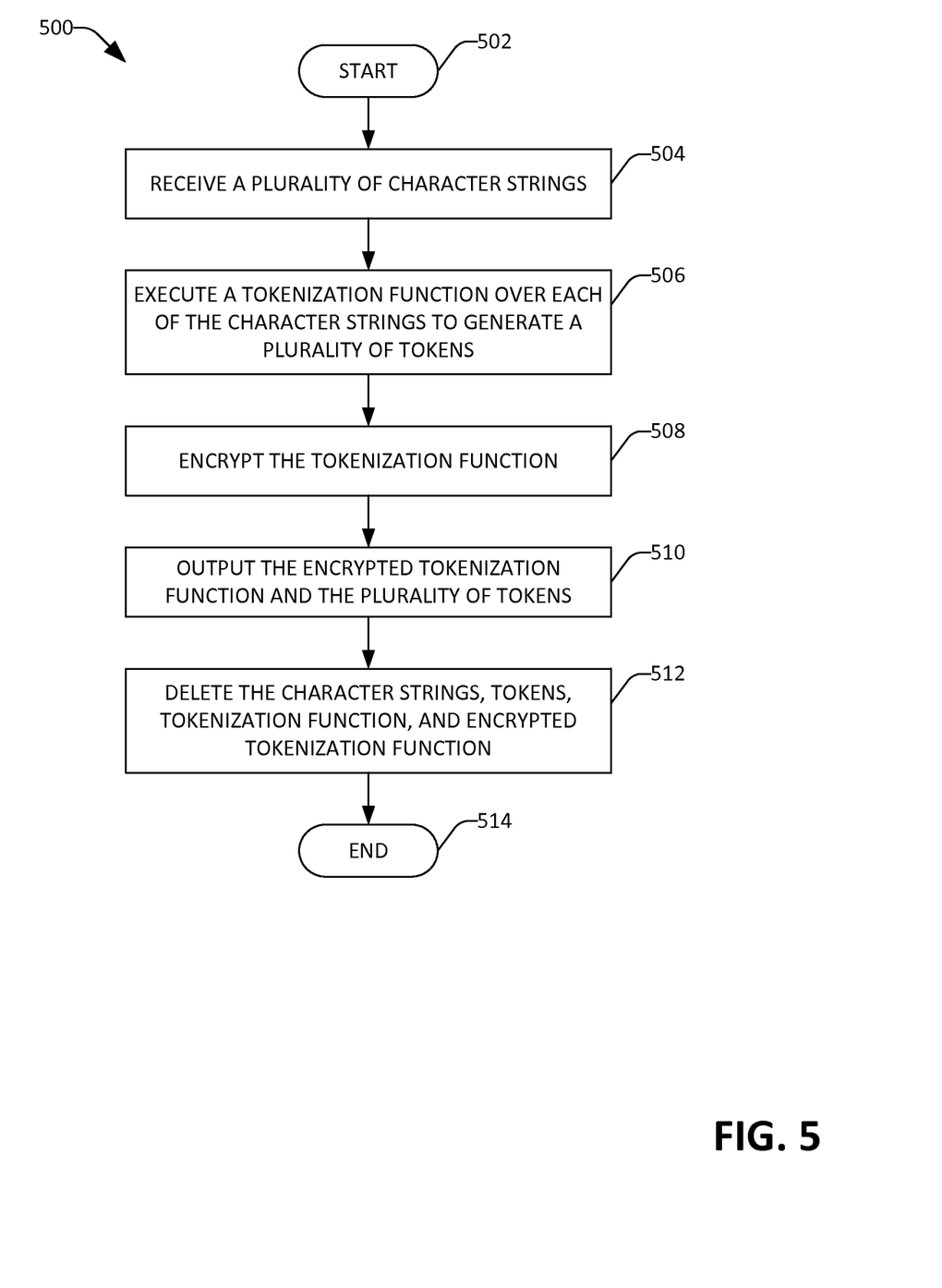
FIG. 5 is a flow diagram illustrating an exemplary methodology for securely inverting a token.

FIGS. 4-5 illustrate exemplary methodologies relating to securely generating and inverting tokens. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

With reference solely to FIG. 4, an exemplary methodology 400 for securely generating a token is illustrated. In an example, the methodology 400 can be executed by a tokenization system that is executing in a secure computing environment. The methodology 400 starts at 402, and at 404 data is received, where the data comprises a character string and an encrypted tokenization function. For example, the character string can conform to a predefined format, such as a bank account number, a social security number, a license number, an identity number, or the like.

At 406, the tokenization function is decrypted. For example, the tokenization system can have access to a cryptographic function and at least one key, wherein the tokenization function can be decrypted using the cryptographic function and the at least one key.

At 408, the tokenization function is executed over the character string to generate a token that represents the character string. For example, the token can also conform to the predefined format. At 410, the character string is deleted from the secure execution environment. Also, while not shown, the tokenization function can be deleted from the secure execution environment. At 412, the token is output for retention in a computer-readable data repository, and the methodology 400 completes at 414.

Turning now to FIG. 5, an exemplary methodology 500 for generating a token database is illustrated. For example, the methodology 500 can be performed by a tokenization system that is executing in a secure computing environment. The methodology 500 starts at 502, and at 504, a plurality of character strings are received. The strings can each have a certain format, and can be, for example, account numbers, identification numbers, etc. At 506, a tokenization function is executed over each of the character strings to generate a corresponding plurality of tokens. At 508, the tokenization function used to generate the tokens is encrypted (e.g., through use of a cryptographic function).

At 510, the encrypted tokenization function and the plurality of tokens are output to a computing system in communication with the secure computing environment. There, the plurality of tokens can be retained in a token database. At 512, the character strings, tokens, tokenization function, and encrypted tokenization function are deleted from the secure computing environment. The methodology 500 then completes at 514.

Figure 6:
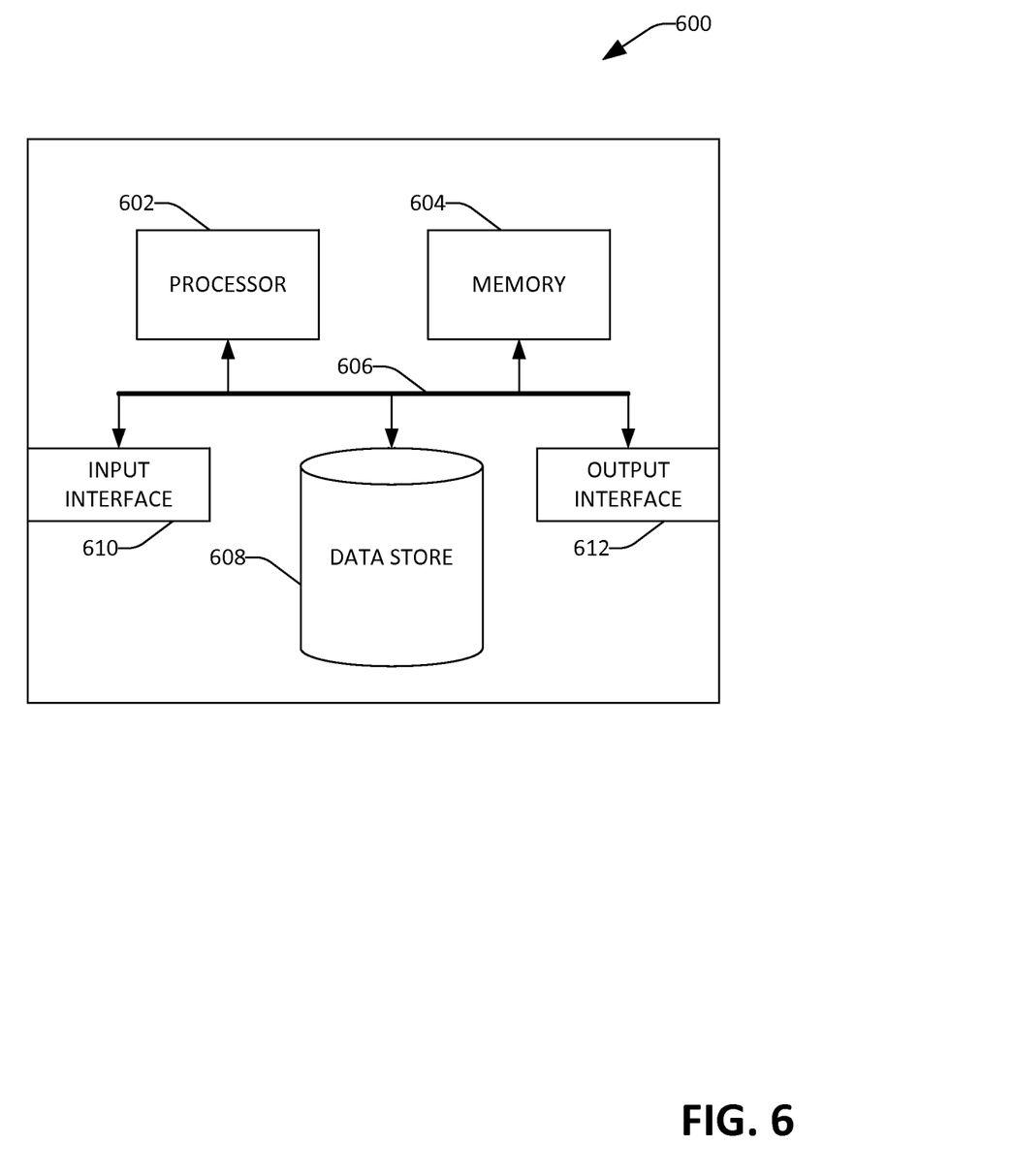
FIG. 6 is an exemplary computing system.

Referring now to FIG. 6, a high-level illustration of an exemplary computing device 600 that can be used in accordance with the systems and methodologies disclosed herein is illustrated. For instance, the computing device 600 may be used in a system that supports generating tokens. By way of another example, the computing device 600 can be used in a system that supports inverting tokens. The computing device 600 includes at least one processor 602 that executes instructions that are stored in a memory 604. The instructions may be, for instance, instructions for implementing functionality described as being carried out by one or more components discussed above or instructions for implementing one or more of the methods described above. The processor 602 may access the memory 604 by way of a system bus 606. In addition to storing executable instructions, the memory 604 may also store a tokenization function, a cryptographic function, a cryptographic key, tokens, character strings, etc.

The computing device 600 additionally includes a data store 608 that is accessible by the processor 602 by way of the system bus 606. The data store 608 may include executable instructions, tokens, character strings, etc. The computing device 600 also includes an input interface 610 that allows external devices to communicate with the computing device 600. For instance, the input interface 610 may be used to receive instructions from an external computer device, from a user, etc. The computing device 600 also includes an output interface 612 that interfaces the computing device 600 with one or more external devices. For example, the computing device 600 may display text, images, etc. by way of the output interface 612.

Additionally, while illustrated as a single system, it is to be understood that the computing device 600 may be a distributed system. Thus, for instance, several devices may be in communication by way of a network connection and may collectively perform tasks described as being performed by the computing device 600.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. An apparatus, comprising:
   a secure execution environment that comprises:
      a processor; and
      memory that is operably coupled to the processor, the
         memory loaded with instructions that, when executed by the processor, cause the processor to perform acts for generating a token that represents a string that conforms to a predefined format, the acts comprising:
- receiving a request to generate the token that is representative of the string from a logically separate computing environment, the request comprising an encrypted tokenization function and the string;
- decrypting the encrypted tokenization function based upon a decryption algorithm that is securely retained in the secure execution environment;
- generating the token by executing the tokenization function over the string;
- deleting the tokenization function and the string responsive to the token being generated;
- outputting the token to the logically separate computing environment;
- subsequent to outputting the token to the logically separate computing environment, receiving the encrypted tokenization function and the token from the logically separate computing environment;
- decrypting the encrypted tokenization function based upon the decryption algorithm that is securely retained in the secure execution environment;
- inverting the tokenization function;
- executing the inverted tokenization function over the token to generate the string;
- deleting the inverted tokenization function responsive to the string being generated; and
- outputting the string to the logically separate computing environment.

2. The apparatus of claim 1, wherein the secure execution environment comprises a first virtual machine executing on the apparatus, the processor being a virtual processor and the memory being a virtual memory, and wherein further the logically separate computing environment comprises a second virtual machine executing on the apparatus.

3. The apparatus of claim 1 being coupleable to a computing device that comprises the logically separate computing environment.

4. The apparatus of claim 3 being a Universal Serial Bus stick.

5. The apparatus of claim 1, the secure execution environment being a portion of an application specific integrated circuit.

6. The apparatus of claim 1, the string being a credit card number or a debit card number.

7. The apparatus of claim 1, the string being a number that identifies a person.

8. The apparatus of claim 1, the acts further comprising encrypting the string prior to outputting the string to the logically separate computing environment.

9. The apparatus of claim 1, wherein the string is encrypted, and wherein the acts further comprise decrypting the string prior to executing the tokenization function over the string.

10. The apparatus of claim 1, wherein executing the tokenization function causes the token to have the predefined format.

11. A method for generating a token that represents a string that conforms to a predefined format, wherein the method is performed by a processor in a secure execution environment, the method comprising:
- receiving a request to generate the token that is representative of the string from a computing environment that is logically separate from the secure execution environment, the request comprising an encrypted tokenization function and the string;
- decrypting the encrypted tokenization function based upon a decryption algorithm that is securely retained in the secure execution environment;
- generating the token by executing the tokenization function over the string;
- deleting the tokenization function and the string responsive to the token being generated;
- outputting the token to the logically separate computing environment;
- subsequent to outputting the token to the logically separate computing environment, receiving the encrypted tokenization function and the token from the logically separate computing environment;
- decrypting the encrypted tokenization function based upon the decryption algorithm that is securely retained in the secure execution environment;
- inverting the tokenization function;
- executing the inverted tokenization function over the token to generate the string;
- deleting the inverted tokenization function responsive to the string being generated; and
- outputting the string to the logically separate computing environment.

12. The method of claim 11, wherein the secure execution environment comprises a first virtual machine executing on an apparatus that comprises the secure execution environment, the processor being a virtual processor and the memory being a virtual memory, and wherein further the logically separate computing environment comprises a second virtual machine executing on the apparatus.

13. The method of claim 11, wherein an apparatus that comprises the secure execution environment is coupleable to a computing device that comprises the computing environment that is logically separate from the secure execution environment.

14. The method of claim 13, wherein the apparatus is a Universal Serial Bus stick.

15. The method of claim 11, the secure execution environment being a portion of an application specific integrated circuit.

16. The method of claim 11, the string being a credit card number or a debit card number.

17. The method of claim 11, the string being a number that identifies a person.

18. The method of claim 11, further comprising encrypting the string prior to outputting the string to the computing environment that is logically separate from the secure execution environment.

19. The method of claim 11, wherein the string is encrypted, and wherein the method further comprises decrypting the string prior to executing the tokenization function over the string.

20. A memory device in a secure execution environment of an apparatus, wherein the memory device comprises instructions for generating a token that represents a string that conforms to a predefined format, wherein the instructions, when executed by a processor in the secure execution environment of the apparatus, cause the processor to perform acts comprising:
- receiving a request to generate the token that is representative of a first the string from a computing environment that is logically separate from the secure execution environment, the request comprising an encrypted tokenization function and the string;

decrypting the encrypted tokenization function based upon a decryption algorithm that is securely retained in the secure execution environment;
generating the token by executing the tokenization function over the string;
deleting the tokenization function and the string responsive to the token being generated;
outputting the token to the logically separate computing environment;
subsequent to outputting the token to the logically separate computing environment, receiving the encrypted tokenization function and the token from the logically separate computing environment;
decrypting the encrypted tokenization function based upon the decryption algorithm that is securely retained in the secure execution environment;
inverting the tokenization function;
executing the inverted tokenization function over the token to generate the string;
deleting the inverted tokenization function responsive to the string being generated; and
outputting the string to the logically separate computing environment.

* * * * *